United States Patent
Kiwaki et al.

(10) Patent No.: US 9,649,888 B2
(45) Date of Patent: May 16, 2017

(54) TIRE

(75) Inventors: Yukihiro Kiwaki, Higashimurayama (JP); Keiichi Kato, Nakano-ku (JP)

(73) Assignee: BRIDGESTONE CORPORATION, Tokyo (JP)

( * ) Notice: Subject to any disclaimer, the term of this patent is extended or adjusted under 35 U.S.C. 154(b) by 295 days.

(21) Appl. No.: 14/234,817

(22) PCT Filed: Jul. 27, 2012

(86) PCT No.: PCT/JP2012/069153
§ 371 (c)(1),
(2), (4) Date: Jan. 24, 2014

(87) PCT Pub. No.: WO2013/015410
PCT Pub. Date: Jan. 31, 2013

(65) Prior Publication Data
US 2014/0174617 A1    Jun. 26, 2014

(30) Foreign Application Priority Data

Jul. 27, 2011    (JP) ................................. 2011-164570

(51) Int. Cl.
*B60C 11/13* (2006.01)
*B60C 11/04* (2006.01)
*B60C 11/03* (2006.01)

(52) U.S. Cl.
CPC ........ *B60C 11/1353* (2013.04); *B60C 11/042* (2013.04); *B60C 11/13* (2013.01);
(Continued)

(58) Field of Classification Search
CPC . B60C 11/13; B60C 11/1353; B60C 11/1307; B60C 2011/133
See application file for complete search history.

(56) References Cited

U.S. PATENT DOCUMENTS 6,415,835 B1 * 7/2002 Heinen ............... B60C 11/0309
152/209.21
6,450,223 B1 * 9/2002 Landers .............. B60C 11/0306
152/209.26
(Continued)

FOREIGN PATENT DOCUMENTS

JP     09-136515 A  *  5/1997
JP     2004-352023 A    12/2004
(Continued)

OTHER PUBLICATIONS

Machine translation for Japan 09-136515 (no date).*
(Continued)

*Primary Examiner* — Steven D Maki
(74) *Attorney, Agent, or Firm* — Sughrue Mion, PLLC

(57) ABSTRACT

A tire wherein a first bulge part and a second bulge part are formed in a circumferential direction groove. The first bulge part has a narrow-tip shape such that, in the tire tread plan view, the size in the tread width direction diminishes along a first direction in the tire circumferential direction. The second bulge part has a narrow-tip shape such that, in the tire tread plan view, the size in the tread width direction diminishes along a second direction opposite to the first direction in the tire circumferential direction. A plurality of first bulge parts and second bulge parts are provided at predetermined intervals in the tire circumferential direction. A groove part which extends in the tire circumferential direction is provided between the first bulge part and the second bulge part which opposes the first bulge part in the tread width direction.

7 Claims, 4 Drawing Sheets

(52) U.S. Cl.
CPC ... *B60C 11/1307* (2013.04); *B60C 2011/0341* (2013.04); *B60C 2011/133* (2013.04)

(56) References Cited

U.S. PATENT DOCUMENTS

| | | | | |
|---|---|---|---|---|
| D716,718 S * | 11/2014 | Kato | ............................ | D12/514 |
| 2005/0126670 A1* | 6/2005 | Godefroid | ........... | B60C 11/0309 |
| | | | | 152/209.22 |
| 2006/0016536 A1* | 1/2006 | Maxwell | ................. | B60C 11/11 |
| | | | | 152/209.18 |
| 2006/0042738 A1* | 3/2006 | Matsumoto | ............. | B60C 11/13 |
| | | | | 152/209.21 |
| 2006/0090828 A1* | 5/2006 | Yamane | .............. | B60C 11/0309 |
| | | | | 152/209.18 |
| 2007/0006955 A1 | 1/2007 | Fukunaga et al. | | |
| 2009/0294003 A1* | 12/2009 | Horiuchi | ............. | B60C 11/0309 |
| | | | | 152/209.23 |
| 2009/0301622 A1* | 12/2009 | Brown | ................ | B60C 11/0306 |
| | | | | 152/209.19 |
| 2012/0160384 A1* | 6/2012 | Amano | ................. | B60C 11/042 |
| | | | | 152/209.18 |
| 2012/0273106 A1* | 11/2012 | Kiwaki | ............... | B60C 11/0302 |
| | | | | 152/209.18 |
| 2013/0000804 A1* | 1/2013 | Kiwaki | ............... | B60C 11/0309 |
| | | | | 152/209.1 |
| 2013/0075001 A1* | 3/2013 | Yasunaga | ............ | B60C 11/0306 |
| | | | | 152/209.8 |

FOREIGN PATENT DOCUMENTS

| | | |
|---|---|---|
| JP | 2005-170381 A | 6/2005 |
| JP | 2010-179895 A | 8/2010 |
| JP | 2011-116273 A | 6/2011 |
| WO | 2004/048130 A1 | 6/2004 |
| WO | 2011027889 A1 | 3/2011 |

OTHER PUBLICATIONS

International Search Report of PCT/JP2012/069153 dated Oct. 23, 2012.
Written Opinion of PCT/JP2012/069153 dated Oct. 23, 2012.
Communication dated Jun. 30, 2015, issued by the European Patent Office in corresponding European Application No. 12817731.8.
Communication dated Jul. 27, 2015, issued by the State Intellectual Property Office of the P.R.C. in corresponding Chinese Application No. 201280036944.3.

* cited by examiner (a)

(b)

(c)

TIRE

CROSS REFERENCE TO RELATED APPLICATIONS

This is a National Stage of International Application No. PCT/JP2012/069153 filed Jul. 27, 2012, claiming priority based on Japanese Patent Application No. 2011-164570 filed Jul. 27, 2011, the contents of all of which are incorporated herein by reference in their entirety.

TECHNICAL FIELD

The present invention relates to a tire in which a circumferential groove extending in a tire circumferential direction is formed, and particularly relates to a tire having a sufficient water drainage performance even when a lug groove component is reduced.

BACKGROUND ART

Conventionally, in a pneumatic tire (hereinafter, referred to as tire) mounted on a passenger vehicle, for example, a method for forming a plurality of circumferential grooves in a tread has been widely used in order to ensure a water drainage performance on a wet road surface.

Further, there is known a tire in which a plurality of protrusions to be inclined relative to a tire circumferential direction are formed on a groove bottom of a circumferential groove in order to aggressively drain rainwater that has entered such a circumferential groove (for example, Patent Literature 1). According to such a tire, a spiral water flow is hardly generated in the rainwater that has entered the circumferential grooves, resulting in the improvement of a water drainage performance.

In recent years, along with an introduction of an electric vehicle or a hybrid automobile in which both an internal combustion engine and an electric motor are used, a further reduction of noise generated by a tire is demanded. Further, even in an automobile mounted thereon with an internal combustion engine, along with a reduction of noise generated by the automobile itself, a further reduction of noise generated by a tire is demanded than ever. Main examples of the noise generated by a tire include a pattern noise resulting from a tread pattern (pitch noise) and a road noise resulting from an unevenness on a road surface. As a method of reducing a pattern noise, it is possible to consider reducing a lug groove component in a tread.

However, even with the tire in which a lug groove component is thus reduced, it is necessary to ensure a water drainage performance at least equal to that of a conventional tire.

CITATION LIST

Patent Literature

[Patent Literature 1] Japanese Patent Publication No. 2005-170381

SUMMARY OF INVENTION

A tire according to a first feature comprises: a circumferential groove extending in a tire circumferential direction; and a land portion that is adjacent to the circumferential groove and that extends in the tire circumferential direction. The circumferential groove is formed with: a first swelling portion that swells from one lateral wall of the circumferential groove toward a center in a widthwise direction of the circumferential groove; and a second swelling portion that swells from the other lateral wall of the circumferential groove toward the center in the widthwise direction of the circumferential groove. The first swelling portion has, in a tread surface view of the tire, a tapered shape in which a size in the tread widthwise direction is narrower as it goes in a first direction in the tire circumferential direction. The second swelling portion has, in the tread surface view of the tire, a tapered shape in which a size in the tread widthwise direction is narrower as it goes in a second direction that is opposite to the first direction in the tire circumferential direction. The first swelling portion and the second swelling portion are formed in plural with a predetermined interval in the tire circumferential direction. A groove extending in the tire circumferential direction is formed between the first swelling portion and the second swelling portion opposite to the first swelling portion in the tread widthwise direction.

DESCRIPTION OF EMBODIMENTS

Figure 1:
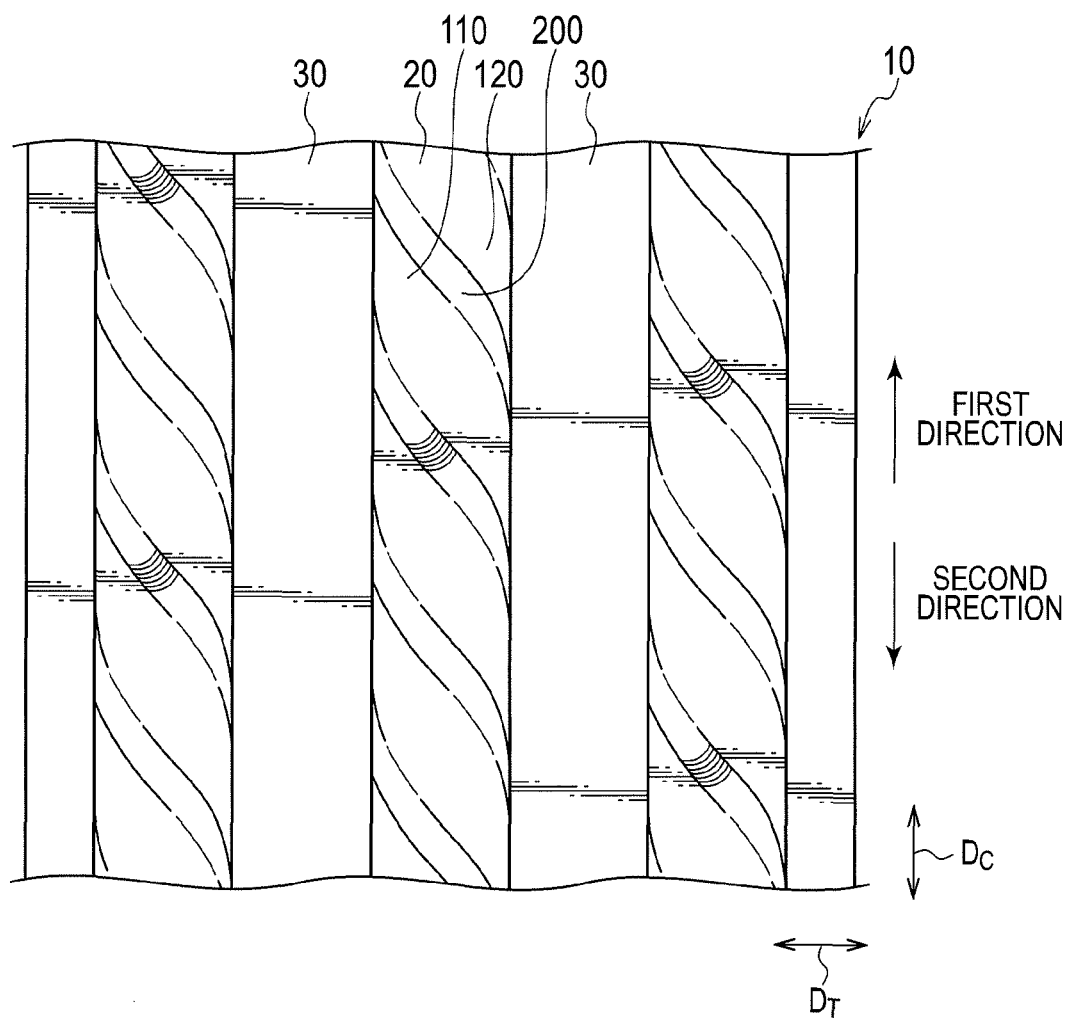
FIG. 1 is a development plan view illustrating a part of a pneumatic tire 10 according to an embodiment.

Next, a tire (pneumatic tire) according to an embodiment will be explained with reference to drawings. It is noted that, in the following description of the drawings, the same or similar reference numerals are used to designate the same or similar portions. It is appreciated that the drawings are schematically shown and the ratio and the like of each dimension are different from the real ones.

Accordingly, specific dimensions and the like should be determined in consideration of the explanation below. Moreover, among the drawings, the respective dimensional relations or ratios may differ.

(1) Schematic Configuration of Pneumatic Tire

FIG. 1 is a development plan view illustrating a part of a pneumatic tire 10 according to the present embodiment. As illustrated in FIG. 1, on the pneumatic tire 10, a plurality of circumferential grooves 20 extending in a tire circumferential direction $D_C$ are formed. Further, the pneumatic tire 10 includes a land portion 30 extending in the tire circumferential direction $D_C$, adjacently to each circumferential groove 20. It is noted that the pneumatic tire 10 may be filled with, instead of air, an inert gas such as nitrogen gas.

In the pneumatic tire 10, a plurality of circumferential grooves 20 are formed; a lug groove component extending in a tread widthwise direction $D_T$ is not formed. It is noted that a thin groove or a siping not illustrated extending in the tread widthwise direction $D_T$ may be formed. The pneumatic tire 10 may be favorably used for an electric automobile or a hybrid automobile in which both an internal combustion engine and an electric motor are used because a pattern noise is reduced due to a reduction in lug groove component.

Inside the circumferential groove 20, a first swelling portion 110 and a second swelling portion 120 are arranged. Between the first swelling portion 110 and the second swelling portion 120 opposite to the first swelling portion 110 in the tread widthwise direction $D_T$, a groove 200 extending in the tire circumferential direction $D_C$ is formed. Specifically, the groove 200 is formed to be inclined relative to the tire circumferential direction $D_C$, and a plurality of grooves 200 are repeatedly formed in the tire circumferential direction $D_C$.

(2) Shape of Circumferential Groove

Figure 2:
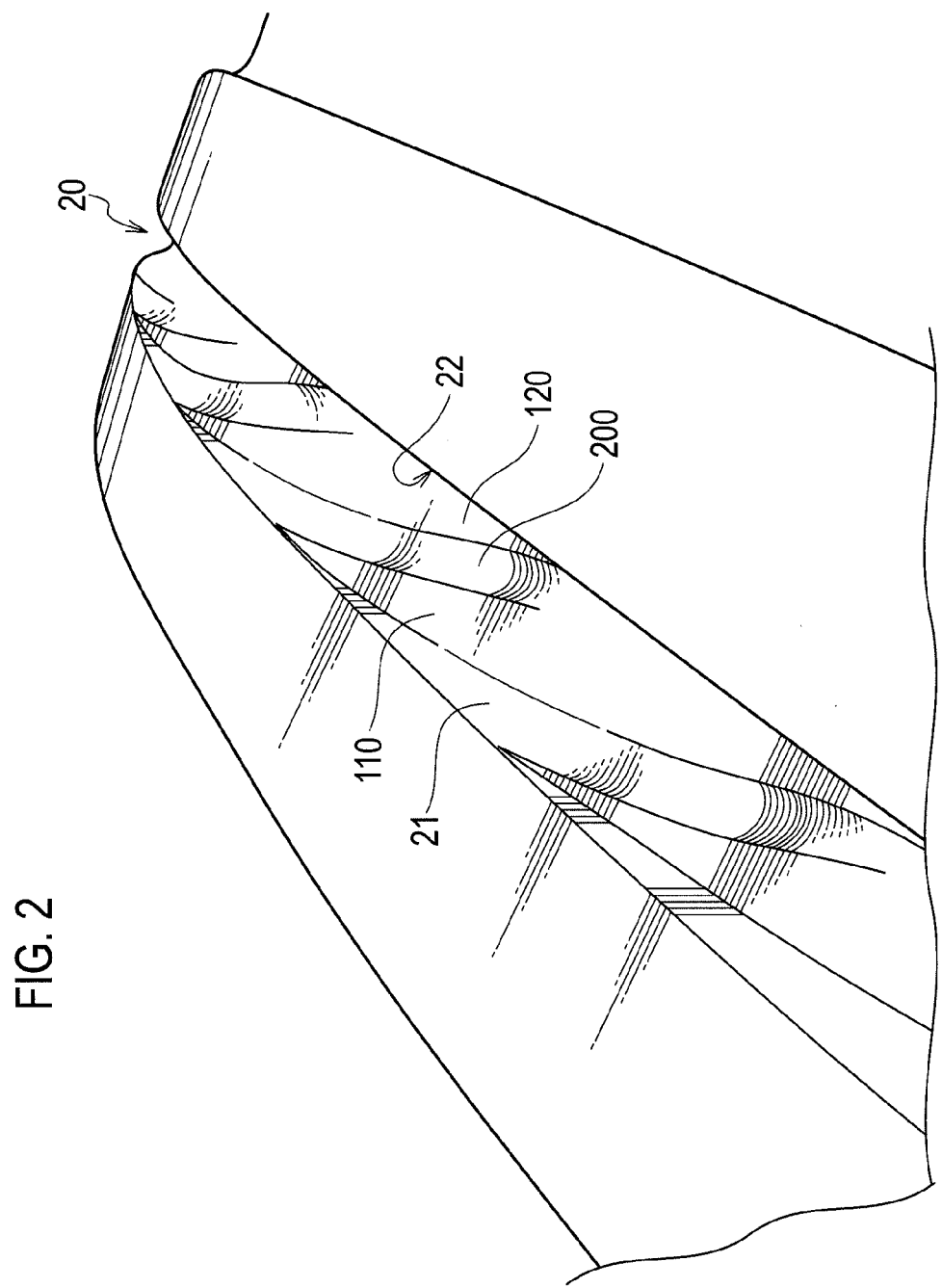
FIG. 2 is an enlarged perspective view of a circumferential groove 20 according to the embodiment.
Figure 3:
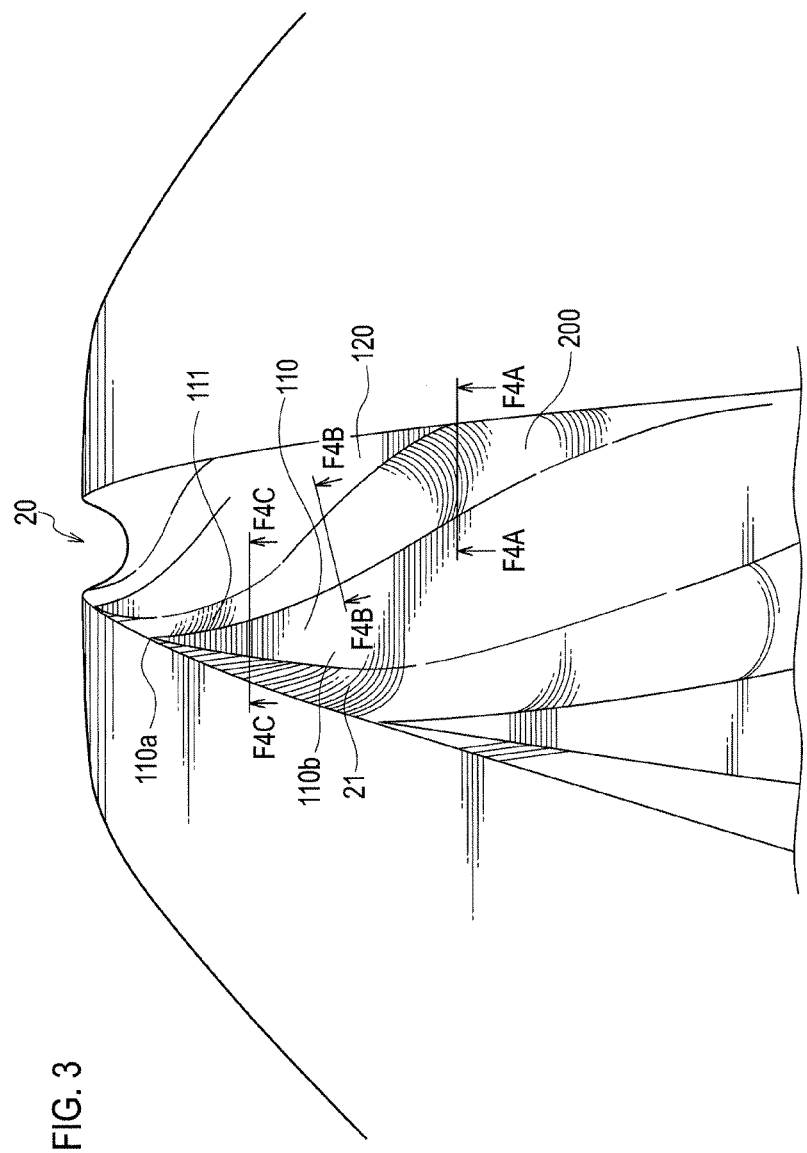
FIG. 3 is an enlarged view of the circumferential groove 20 as seen from a tire circumferential direction $D_C$ according to the embodiment.

FIG. 2 is an enlarged perspective view of the circumferential groove 20. FIG. 3 is an enlarged view of the circumferential groove 20 as seen from the tire circumferential direction $D_C$. FIGS. 4(a) to (c) are cross sectional views of the circumferential groove 20. Specifically, FIG. 4(a) is a cross sectional view, of the circumferential groove 20, taken along a line F4A to F4A illustrated in FIG. 3. FIG. 4(b) is a cross sectional view, of the circumferential groove 20, taken along a line F4B to F4B illustrated in FIG. 3. FIG. 4(c) is a cross sectional view, of the circumferential groove 20, taken along a line F4C to F4C illustrated in FIG. 3.

Figure 4:
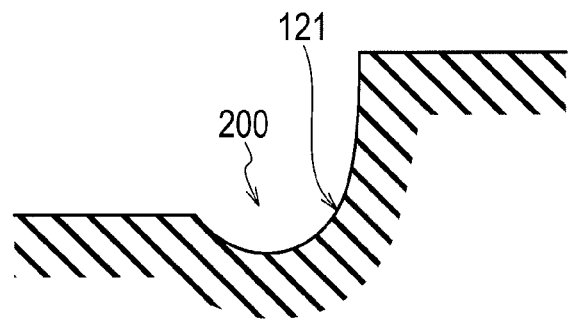
FIG. 4 is a cross sectional view of the circumferential groove 20 according to the embodiment.
Figure 4:
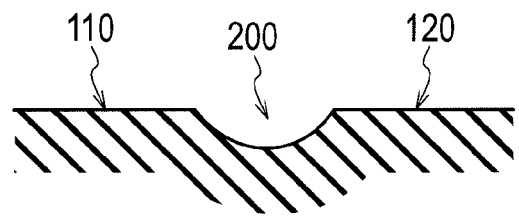
Figure 4:
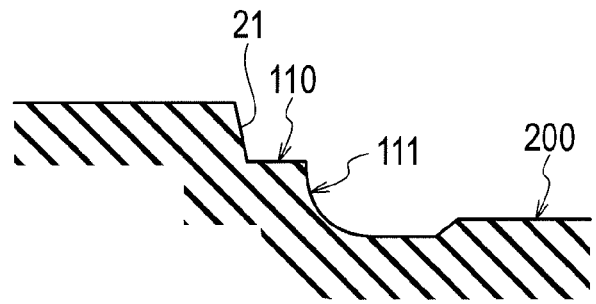

As illustrated in FIG. 2 to FIG. 4, the first swelling portion 110 and the second swelling portion 120 are formed in plural with a predetermined distance (for example, about 30 mm) in the tire circumferential direction $D_C$.

The first swelling portion 110 swells from one lateral wall 21 of the circumferential groove 20 toward a center in a widthwise direction of the circumferential groove 20. Further, the first swelling portion 110 has, in a tread surface view of the pneumatic tire 10, a tapered shape in which the size in the tread widthwise direction $D_T$ is narrower as it goes in a first direction (upward direction in FIG. 2 and FIG. 3) in the tire circumferential direction $D_C$.

The second swelling portion 120 has a shape similar to that of the first swelling portion 110. Specifically, the second swelling portion 120 swells from the other lateral wall 22 of the circumferential groove 20 toward a center in the widthwise direction of the circumferential groove 20. Further, the second swelling portion 120 has, in a tread surface view of the pneumatic tire 10, a tapered shape in which the size in the tread widthwise direction $D_T$ is narrower as it goes in a second direction (downward direction in FIG. 2 and FIG. 3) opposite to the first direction in the tire circumferential direction $D_C$.

A lateral surface 111 of the first swelling portion 110 along the lateral wall 21 has, in the cross section along the tread widthwise direction $D_T$ and the tire radial direction $D_R$, an arc-like shaped portion recessed toward the lateral wall 21 (see FIG. 4(c)). Similarly, a lateral surface 121 of the second swelling portion 120 along the lateral wall 22 has, in the cross section along the tread widthwise direction $D_T$ and the tire radial direction $D_R$, an arc-like shaped portion recessed toward the lateral wall 22 (see FIG. 4(a)).

Further, an end 110b at a wider width side in the tread widthwise direction $D_T$ of the first swelling portion 110 and the second swelling portion 120 is located inside, in the tire radial direction $D_R$, from a tread surface of the land portion 30 adjacent to the circumferential groove 20. On the other hand, an end 110a at a narrower width side in the tread widthwise direction $D_T$ of the first swelling portion 110 is located at the approximately same height as that of a tread surface of the land portion 30 in the tire radial direction $D_R$. Similarly, an end (end 120a described later) at a narrower width side in the tread widthwise direction $D_T$ of the second swelling portion 120 is located at the approximately same height as that of a tread surface of the land portion 30 in the tire radial direction $D_R$. According to the shape of such first swelling portion 110 and second swelling portion 120, the groove 200 can be formed as a spiral-like form inside the circumferential groove 20.

A bottom surface of the groove 200 is communicated, as one seamless surface, to the lateral surface 111 of the first swelling portion 110. Further, the bottom surface of the groove 200 is communicated, as one seamless surface, to the lateral surface 121 of the second swelling portion 120. That is, the bottom surface of the groove 200 has no portion in which an unevenness or a ridge is formed, and has a shape that little disturbs a flow of rainwater that has entered the groove 200.

(3) Operation and Effect

According to the pneumatic tire 10, between the first swelling portion 110 and the second swelling portion 120, a plurality of grooves 200 extending in the tire circumferential direction $D_C$ are formed. The first swelling portion 110 has, in a tread surface view of the pneumatic tire 10, a tapered shape in which the size in the tread widthwise direction $D_T$ is narrower as it goes in a first direction in the tire circumferential direction $D_C$. Similarly, the second swelling portion 120 has, in a tread surface view of the pneumatic tire 10, a tapered shape in which the size in the tread widthwise direction $D_T$ is narrower as it goes in a second direction in the tire circumferential direction $D_C$.

Rainwater flowing in such a groove 200 flows in a spiral form from the bottom surface of the groove 200 toward the lateral surface 111 of the first swelling portion 110 and the lateral surface 121 of the second swelling portion 120. Thus, the rainwater that has entered the circumferential groove 20 flows smoothly without creating a large turbulence inside the circumferential groove 20. That is, even when a lug groove component is reduced as in the pneumatic tire 10, it is possible to provide a sufficient water drainage performance.

In the present embodiment, the lateral surface 111 of the first swelling portion 110 is of arc-like shape recessed toward the lateral wall 21. Further, in the present embodiment, the lateral surface 121 of the second swelling portion 120 is of arc-like shape recessed toward the lateral wall 22. Thus, the rainwater that has entered the circumferential groove 20 is more easily flown in a spiral form, resulting in further increasing a water drainage performance.

In the present embodiment, the end 110b (end 120b) at a wider width side of the first swelling portion 110 (second swelling portion 120) is located inside, in the tire radial direction $D_R$, from a tread surface of the land portion 30. Further, the end 110a (end 110b) at a narrower width side of the first swelling portion 110 (second swelling portion 120) is located at the approximately same height as that of a tread surface of the land portion 30 in the tire radial direction $D_R$. Moreover, the bottom surface of the groove 200 is communicated, as one seamless surface, to the lateral surface 111 of the first swelling portion 110, and communicated, as one seamless surface, to the lateral surface 121 of the second swelling portion 120.

As a result, it is possible to bring a flow of rainwater having entered the circumferential groove 20 in a spiral form having a large radius of rotation, resulting in a further improvement of water drainage performance.

In particular, the water led to the first direction along a direction in which the groove 200 extends travels over the end 110*b* at a wider width side of the first swelling portion 110, and thereafter, the water is prevented by the end 110*a* at a narrower width side of the first swelling portion 110 after which it is led to the other lateral wall 22 of the circumferential groove 20 from one lateral wall 21 of the circumferential groove 20. Further, the water is prevented by the end 120*a* at a narrower width side of the second swelling portion 120 and the other lateral wall 22 of the circumferential groove 20, resulting in a turbulent flow to be led to the first direction. As a result of such a flow of water being continuing, the flow of water is brought in a spiral form.

(4) Other Embodiments

So far, the contents of the present invention are disclosed through the above embodiment of the present invention. However, it should not be interpreted that the statements and drawings constituting a part of the present disclosure limit the present invention. From this disclosure, a variety of alternate embodiments, examples, and applicable techniques will become apparent to one skilled in the art.

For example, in the above-described embodiment, the bottom surface of the groove 200 is communicated, as one seamless surface, to the lateral surface 111 of the first swelling portion 110, and communicated, as one seamless surface, to the lateral surface 121 of the second swelling portion 120; however, the bottom surface of the groove 200 may not necessarily be communicated, as one seamless surface like this, and may have a portion where a slight unevenness or ridge is formed.

In the above-described embodiment, the lateral surface 111 of the first swelling portion 110 and the lateral surface 121 of the second swelling portion 120 are of arc-like shape; however, may not necessarily be of arc-like shape, and may be liner in a cross section along the tread widthwise direction $D_T$ and the tire radial direction $D_R$.

As described above, needless to say, the present invention includes various embodiments and the like not described here. Therefore, the technical range of the present invention is to be defined only by the inventive specific matter according to the adequate claims from the above description.

INDUSTRIAL APPLICABILITY

According to a characteristic of the present invention, even when a lug groove component is reduced, it is possible to provide a tire having a sufficient water drainage performance.

The invention claimed is:

1. A tire comprising:
a circumferential groove extending in a tire circumferential direction; and
a land portion that is adjacent to the circumferential groove and that extends in the tire circumferential direction, wherein
the circumferential groove is formed with:
a first swelling portion that swells from one lateral wall of the circumferential groove toward a center in a widthwise direction of the circumferential groove; and
a second swelling portion that swells from the other lateral wall of the circumferential groove toward the center in the widthwise direction of the circumferential groove,
the first swelling portion has, in a tread surface view of the tire, a tapered shape in which a size in the tread widthwise direction is narrower as it goes in a first direction in the tire circumferential direction, the second swelling portion has, in the tread surface view of the tire, a tapered shape in which a size in the tread widthwise direction is narrower as it goes in a second direction that is opposite to the first direction in the tire circumferential direction,
the first swelling portion and the second swelling portion are formed in plural with a predetermined interval in the tire circumferential direction, and
a groove extending in the tire circumferential direction is formed between the first swelling portion and the second swelling portion opposite to the first swelling portion in the tread widthwise direction,
wherein the groove is formed to be inclined relative to the tire circumferential direction in the tread surface view of the tire, and
wherein a width of the groove between a first outward end of the groove at one lateral wall and a leading edge of the groove becomes narrower in the tread widthwise direction along the entire first outward end as the groove extends in the first direction.

2. The tire according to claim 1, wherein
a lateral surface along the one lateral wall of the first swelling portion has, in a cross section along the tread widthwise direction and the tire radial direction, an arc-like shaped portion recessed toward the one lateral wall, and
a lateral surface along the other lateral wall of the second swelling portion has, in the cross section along the tread widthwise direction and the tire radial direction, an arc-like shaped portion recessed toward the other lateral wall.

3. The tire according to claim 1, wherein
ends at a wider width side in the tread widthwise direction of the first swelling portion and the second swelling portion are located inside from a tread surface of the land portion adjacent to the circumferential groove in the tire radial direction, and
ends at a narrower width side in the tread widthwise direction of the first swelling portion and the second swelling portion are located at the approximately same height as the tread surface of the land portion in the tire radial direction.

4. The tire according to claim 2, wherein
a bottom surface of the groove is communicated, as one seamless surface, to a lateral surface of the first swelling portion, and communicated, as one seamless surface, to a lateral surface of the second swelling portion.

5. The tire according to claim 1, wherein
the circumferential groove is formed with:
the upper surface of the first swelling portion being parallel to the tread surface from one lateral wall of the circumferential groove toward a center in a widthwise direction of the circumferential groove in a cross section along the tread widthwise direction and the tire radial direction; and
the upper surface of the second swelling portion being parallel to the tread surface from the other lateral wall of the circumferential groove toward the center in the widthwise direction of the circumferential groove in a cross section along the tread widthwise direction and the tire radial direction.

6. The tire according to claim 1, wherein a position of the groove is offset in the tire circumferential direction from a position of a groove provided in an adjacent circumferential groove.

7. The tire according to claim 1, wherein the groove comprises a plurality of grooves, and wherein an inclination direction of all of the plurality of grooves is in the same direction.

* * * * *